J. R. TIBBLES.
DRIVING GEAR FOR VEHICLES.
APPLICATION FILED SEPT. 25, 1911.
1,026,375.
Patented May 14, 1912.
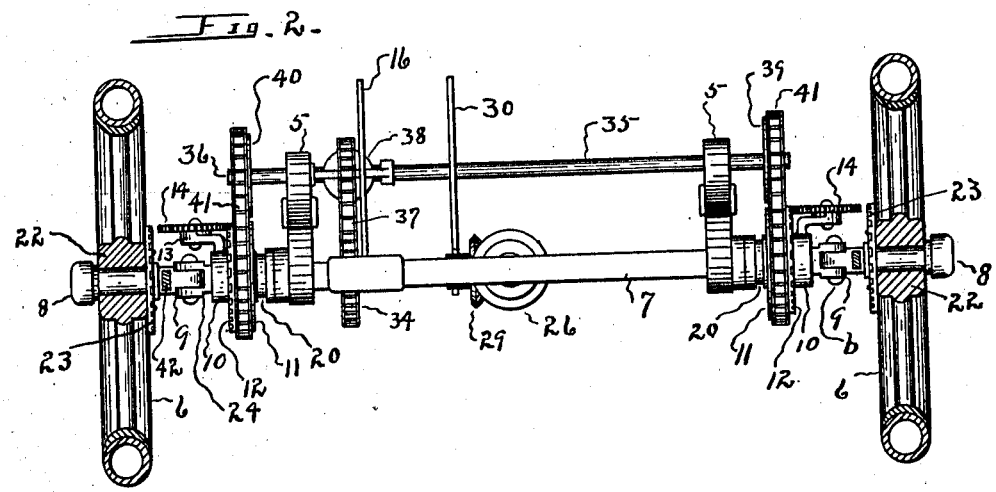
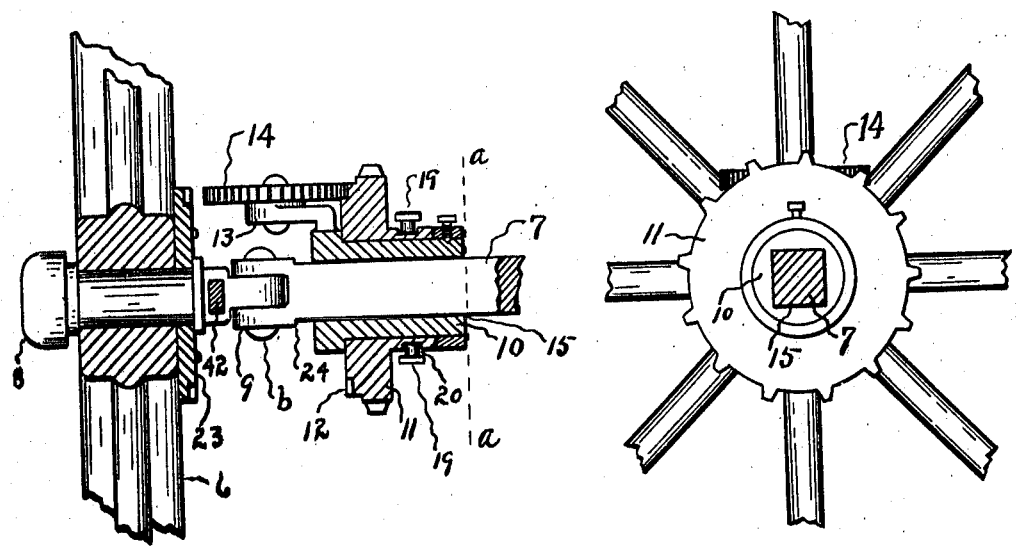

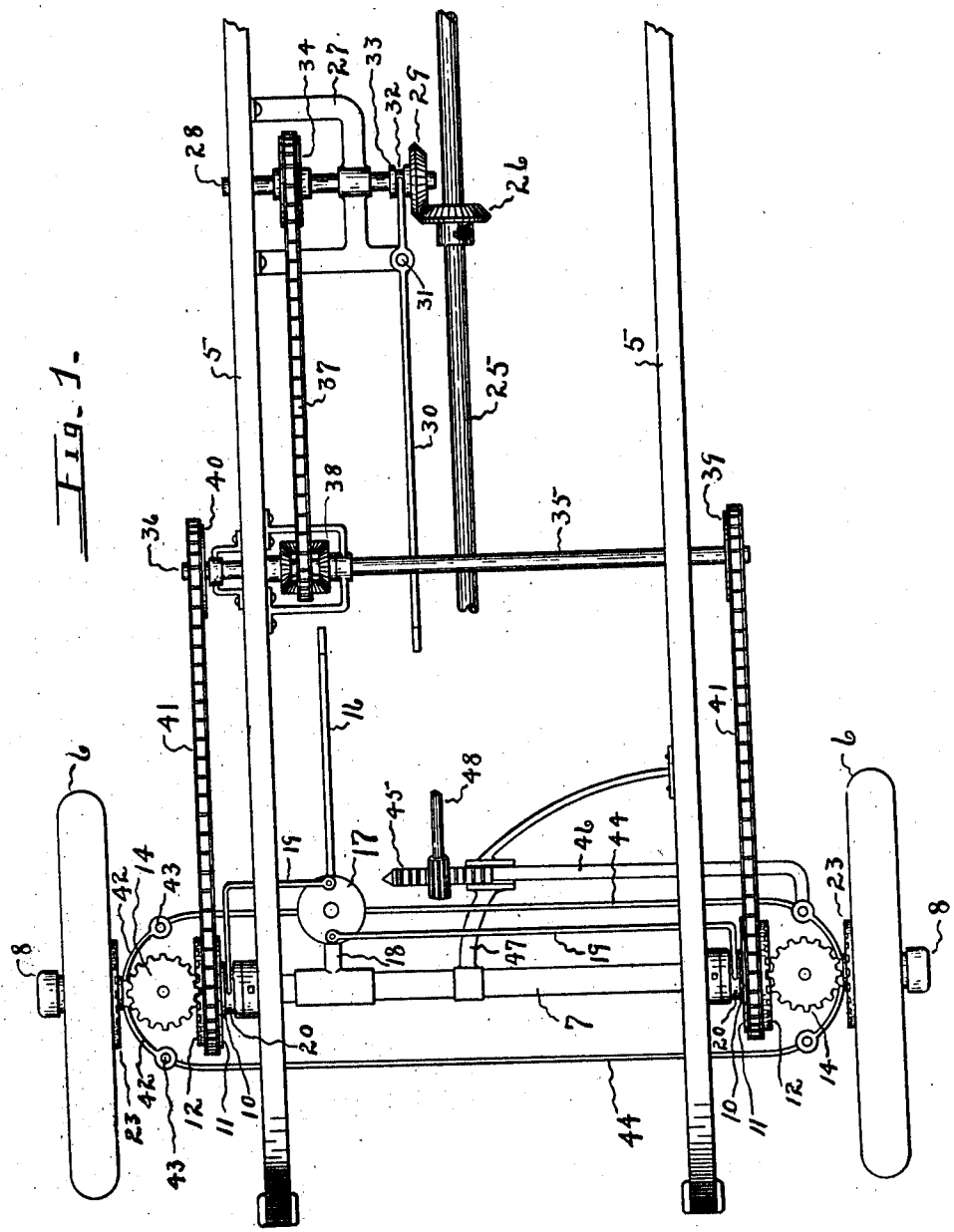

UNITED STATES PATENT OFFICE.

JUDSON R. TIBBLES, OF MACEDONIA, IOWA.

DRIVING-GEAR FOR VEHICLES.

1,026,375.   Specification of Letters Patent.   Patented May 14, 1912.

Application filed September 25, 1911. Serial No. 651,135.

*To all whom it may concern:*

Be it known that I, JUDSON R. TIBBLES, a citizen of the United States, residing at Macedonia, in the county of Pottawattamie and State of Iowa, have invented certain new and useful Improvements in Driving-Gear for Vehicles, of which the following is a specification.

This invention relates to driving gears for automobiles, and has reference to the provision of mechanism for driving the front wheels on occasions of emergency, as when ascending inclines, moving heavy loads or driving over smooth surfaces, where it is desired to cause a rotation of all of the wheels by operation of the engine.

One of the particular objects of the invention is to provide a construction whereby the front wheels may be positively rotated, whenever desired, without requiring a rotation of the front axle.

Another object is to provide such a construction that, when the front wheels are not in engagement with the driving mechanism, such mechanism will be wholly at rest while the vehicle is moving, to thereby avoid noise, friction and the wear of parts.

With the above objects in view and others to be hereinafter explained, the invention consists of the novel construction, combination and arrangement of parts as described herein and claimed, and as illustrated in the drawing, wherein,—

Figure 1 is a plan view, partly broken, of the front part of an automobile, showing the driving gear. Fig. 2 is a vertical, front view of the parts shown in Fig. 1, the automobile wheels being in section, the front coupling-bar of the steering mechanism being removed, with the arms for the coupling-bar in section. Fig. 3 is an enlarged detail relating to Fig. 2, showing the slidably mounted gear upon the non-rotatable axle, the sleeve with sprocket wheel thereon and wheel-hub with pinion secured thereto, being in section. Fig. 4 is a view in transverse section, on line *a—a* of Fig. 3.

Referring now to the drawing for a more particular description, numeral 5 indicates the frame and 6 the front wheels of an automobile.

The non-rotatable axle for the front wheels is indicated at 7, its ends being provided with stub axles 8, these axles being connected with the main axle by means of hinges 9.

At 10, adjacent to each stub shaft, is indicated a sleeve which provides a bearing for an upright rotatable member or sprocket wheel 11 having on its outer side an annular gear 12. Sleeves 10 are each provided with an arm or bracket 13 upon which is mounted a horizontally disposed operating pinion 14 in mesh with gear 12. Each sleeve may have an angular aperture 15 to conform to the shape of the axle, in cross-section (Fig. 4), to prevent its rotation; and under control of lever 16 the sleeves may have coincident, sliding movements upon said axle toward or in directions opposed to each other. For this purpose lever 16 may be secured to the horizontal disk 17, said disk having a pivotal mounting upon arm 18, which is secured to the axle; and pull-rods or L-shaped links 19 may be pivotally connected at one of their ends with the disk opposite to each other, the opposite end of each link engaging in a channel or annular groove 20, these grooves being formed in the sleeves, near the sprocket wheels 11. The hubs of the automobile wheels are indicated at 22, and wheels 6 are free to rotate upon the spindles of the stub axles subject to the control herein mentioned. Secured upon the inner end of each hub is a vertically disposed pinion 23. Upon and near the ends of the axle are formed projections or stops 24; and under control of lever 16, each sleeve may slide outwardly until it encounters a projection 24. The sliding movements of the sleeves will be coincident, and the parts are so proportioned that when the sleeves make contact with projections 24 the centers of pinions 14 will be in alinement with the bolts of pivots *b* of hinges 9, and the horizontal pinions 14 at this time will be in mesh with pinions 23. It will thus be seen that if wheels 11 are driven or rotated by a suitable power, the front automobile wheels may be positively rotated from the same source of power. A sidewise swinging movement of the lever in one direction will cause engagement of pinions 14 with pinions 23 for the rotation, in either direction, of said wheels; and a movement of the lever in an opposite direction will move the operating pinions 14 out of engagement with pinions 23.

At 25 is indicated the usual engine-driven shaft of the automobile (engine not shown). This shaft is provided with the pinion 26. Journaled in bracket 27 and in the frame, and adapted to have a sliding movement longitudinally in its bearings, is shaft 28, upon the inner end of which is mounted the intermediate pinion 29; and by means of lever 30 pivotally mounted at 31 upon bracket 27, pinion 29 may be engaged with pinion 26, since lever 30 engages in the annular groove 32 formed between pinion 29 and collar 33 of shaft 28. As thus described, shaft 28 may be rotated, and its rotation may be terminated by an operator, whenever desired. Upon shaft 28 is mounted a sprocket wheel 34 which may cause a rotation of shafts 35 and 36 by reason of sprocket chain 37 being in engagement with the differential gear 38; and mounted upon the respective shafts 35 and 36 are sprocket wheels 39 and 40. Sprocket chains 41 are employed, and are mounted upon wheels 39 and 40 to connect with each wheel 11, whereby the rotation of the driving shaft may cause the rotation of said wheels 11, whenever desired, the control therefor being the lever 30 above mentioned.

When it is desired to move a heavy load, or when ascending inclines, the operator, by use of lever 16 may move sleeves 10 outwardly upon the axle 7, pinions 14 thereupon moving into engagement with pinions 23 of the automobile wheels. The operator then, by use of lever 30, may cause a rotation of wheels 11 as above mentioned.

From the description will be seen that the mechanism adds no friction whatever during the movement of the automobile unless the pinions have been disposed in mesh, by the operator, and this is obviously a desirable feature. Also it will be noted that, on account of the construction, it is not necessary to provide for a rotation of the front axle. As is well known, the front axle must sustain about half of the entire weight of the automobile, and its rotation would therefore be accompanied by a considerable amount of friction. Also by the construction as shown it is not necessary to bisect and therefore greatly weaken the front axle to provide for the use of a differential gear, since this gear is otherwise provided for.

It is obvious that sleeves 10 and devices for operating the same could be dispensed with, and clutch 33 could be depended upon for causing a positive rotation of the front vehicle wheels, but such a construction would be attended with many disadvantages, for the reason that pinions 14 would be in constant mesh with pinions 23 of the vehicle wheels, which would cause the attendant and continued noise of driven gears, and would add materially to friction. The novel construction herein shown is considered the best. As first mentioned, it has for its object to avoid these objectionable features, and to leave the front vehicle wheels wholly disengaged except when ascending inclines or moving heavy loads.

While I have shown and described numerous sprocket wheels and chain connections, it is apparent that gears could be substituted therefor and operation would be substantially the same; and while I have explained construction in detail, I do not limit myself to exactness in this respect, nor size, form or proportion, except so far as limited by the appended claims.

Any suitable steering means may be provided, the means herein shown being the rearwardly and forwardly projecting, rigid arms 42 of the stub shafts, said arms having pivotal connections at 43 with the ends of the coupling-bars 44; a rack 45 having an arm 46 being employed, said arm being pivotally connected with one of the coupling-bars. The rack may be supported upon bracket 47, and may be moved longitudinally by the pinion of the steering-shaft 48.

The front wheels may be guided under control of the steering devices and at that time, if the horizontal pinions 14 are in engagement with the vertical pinion 23 of the automobile wheels, the centers of pinions 14 will be in vertical alinement with the pivots upon which the stub shafts swing.

Having fully described the several parts, a further explanation relating to operation is not necessary.

What I claim and desire to secure by Letters Patent is,—

1. A driving gear for the front wheels of vehicles, comprising, in combination with a non-rotatable axle; a pair of sleeves non-rotatively mounted upon the axle; a pinion mounted upon each vehicle wheel; a rotatable wheel-member loosely mounted upon each sleeve; a pinion carried by each sleeve and in mesh with the rotatable wheel-member; and means to reciprocate the sleeves longitudinally of the axle to cause the pinions of the sleeves to make contact or non-contact with the pinions of the vehicle wheels.

2. A driving gear for the front wheels of vehicles, comprising, in combination with a non-rotatable axle; a pair of sleeves mounted non-rotatively upon the axle; a pinion mounted upon each vehicle wheel; vertically-disposed, rotatable wheel-members; one of said rotatable wheel-members having a bearing upon each sleeve; horizontally-disposed pinions; one of said pinions being mounted upon each sleeve and in mesh with a vertically-disposed wheel-member; means to cause sliding movements of the sleeves upon said axle, the horizontally-disposed pinions moving in alternation to engagement and disengagement with the pinions of the vehicle wheels; and means upon the vehicle for terminating the rotation of the vertically-disposed wheel-members.

3. A driving gear for the purpose described, comprising, in combination with a non-rotatable axle provided with projections near its ends, and with vehicle wheels each provided with a pinion and loosely mounted upon the axle; sleeves upon the axle; an operating pinion mounted upon each sleeve; a rotatable member loosely mounted upon each sleeve and having a gear in contact with an operating pinion; said sleeves being adapted to have co-incident sliding movements in directions opposed to each other to cause their engagement with said projections, the operating pinions moving into engagement with the pinions of the vehicle wheels; said sleeves being adapted to have co-incident movements in directions toward each other, the operating pinions thereby being disengaged from the pinions of the vehicle wheels; and means upon the vehicle to terminate the movements of the rotatable members.

4. A driving gear for vehicles, comprising, in combination with a non-rotatable axle having projections formed thereon and with wheels normally rotatable upon said axles; a pinion mounted upon each vehicle wheel; sleeves non-rotatively mounted upon the axle; a vertically-disposed rotatable member upon each sleeve; an operating pinion supported by each sleeve and in mesh with the rotatable member thereof; said sleeves being movable in directions opposed to each other for engagement with the projections of the axle, the pinions upon the sleeves moving into engagement with the pinions of the vehicle wheels; and said sleeves being movable in directions of each other to cause disengagement of the pinions of the sleeves and the pinions of said vehicle wheels.

5. A driving gear for the front wheels of vehicles, comprising, in combination with a non-rotatable axle, and with a driving shaft provided with a gear; a differential gear; an intermediate gear between and adapted to engage the gear of the driving shaft for rotating the differential gear; a pair of sleeves non-rotatively mounted upon the axle; a pinion mounted upon each vehicle wheel; wheel-members having bearings upon the sleeves and adapted to be rotated by the differential gear; a pinion carried by each sleeve and in mesh with a wheel-member; means to reciprocate the sleeves longitudinally of the axle to cause the pinions of the sleeves to make contact or non-contact with the pinions of the vehicle wheels; and means upon the vehicle for disengaging the intermediate gear from the gear of the driving shaft.

6. In combination, a driving gear for the front wheels of a vehicle having a non-rotatable main axle; stub-axles providing bearings for the vehicle wheels; hinges between and connecting the terminals of the stub-axles with the terminals of the main axle; pinions rigidly secured to the vehicle wheels; a pair of sleeves, each provided with an upright bracket and mounted non-rotatively upon the main axle; a horizontal pinion mounted upon each bracket; rotatable members having bearings upon the sleeves and provided with annular gears in engagement with the horizontal pinions; said sleeves being longitudinally movable to dispose the axes of the horizontal pinions in alinement with the longitudinal axes of the hinges and to engage said horizontal pinions with the pinions of the vehicle wheels.

7. In combination, a driving gear for the front wheels of a vehicle having a non-rotatable main axle with projections near its ends; stub-axles providing bearings for the vehicle wheels; hinges between and connecting the terminals of the stub-axles with the terminals of the main axle; a pinion secured upon each vehicle wheel; a pair of sleeves each provided with an upright bracket and mounted non-rotatively upon the main axle; a horizontally disposed pinion mounted upon each bracket; rotatable members having bearings upon the sleeves, each having an annular gear in engagement with a horizontally disposed pinion; each sleeve being longitudinally movable to engage a projection of the main axle, the axis of each horizontally disposed pinoin moving into alinement with the axis of a hinge, the horizontally disposed pinions moving into engagement with the pinions of the vehicle wheels.

8. A driving gear for the front wheels of vehicles, comprising, in combination with a non-rotatable axle, and with a driving shaft having a gear; a differential gear; an intermediate gear between and adapted to engage the gear of the driving shaft for rotating the differential gear; a pair of sleeves non-rotatively mounted upon the axle; a pinion mounted upon each vehicle wheel; vertically disposed wheel-members journaled upon the sleeves; horizontally disposed pinions: each of said pinions being mounted upon a sleeve and in mesh with a vertically disposed wheel-member; means to cause sliding movements of the sleeves upon said axle, the horizontally disposed pinions moving in alternation to engagement and disengagement with the pinions of the vehicle wheels; and means upon the vehicle for disengaging the intermediate gear from the gear of the driving shaft.

9. A driving gear for the front wheels of vehicles, comprising, in combination with a non-rotatable axle provided with projections near its ends, a driving shaft provided with a gear, vehicle wheels each provided with a pinion and loosely mounted upon the axle; a differential gear; an intermediate gear between and adapted to engage the gear of the driving shaft for rotating the differential gear; sleeves mounted upon the axle; an operating pinion mounted upon each sleeve; a wheel-member loosely mounted upon each sleeve and having a gear in contact with an operating pinion; said sleeves being adapted to have co-incident sliding movements in directions opposed to each other to cause their engagement with said projections, the operating pinions moving into engagement with the pinions of the vehicle wheels; said sleeves being adapted to have co-incident movements in directions toward each other, the operating-pinions thereby being disengaged from the pinions of the vehicle wheels; and means upon the vehicle for disengaging the intermediate gear from the gear of the driving shaft.

10. A driving gear for vehicles, comprising, in combination with a non-rotatable axle having projections formed thereon and with wheels normally rotatable upon said axles; a driving shaft provided with a gear; a differential gear; an intermediate gear between and adapted to engage the gear of the driving shaft for rotating the differential gear; a pinion mounted upon each vehicle wheel; sleeves non-rotatively mounted upon the axle; a vertically-disposed wheel-member journaled upon each sleeve; an operating pinion supported by each sleeve and in mesh with a wheel-member; means to move the sleeves in directions opposed to each other for engagement with the projections of the axle, the pinions upon the sleeves moving into engagement with the pinions of the vehicle wheels; means to move the sleeves toward each other to cause disengagement of the pinions of the sleeves and the pinions of said vehicle wheels; and means upon the vehicle for disengaging the intermediate gear from the gear of the driving shaft.

In testimony whereof I have affixed my signature in presence of two witnesses.

JUDSON R. TIBBLES.

Witnesses:
HIRAM A. STURGIS,
MINNIE M. TIBBLES.

---

Copies of this patent may be obtained for five cents each, by addressing the "Commissioner of Patents. Washington, D. C."